United States Patent Office 3,474,113
Patented Oct. 21, 1969

3,474,113
SYNTHESIS OF 4-PYRONES
Alfred A. Schleppnik, St. Louis, Mo., assignor to Monsanto Company, St. Louis, Mo., a corporation of Delaware
No Drawing. Continuation-in-part of application Ser. No. 579,217, Sept. 14, 1966. This application Aug. 26, 1968, Ser. No. 755,406
Int. Cl. C07d 7/16
U.S. Cl. 260—345.8          9 Claims

ABSTRACT OF THE DISCLOSURE

Synthesis of 4-pyrone of the formula

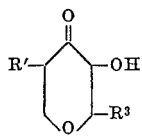

wherein R' is hydrogen or an alkyl, having at least one and a maximum of four carbon atoms, phenyl or tolyl and $R^3$ is hydrogen, alkyl having at least one and a maximum of four carbon atoms, formed by the reaction of an α-acylvinylthioether of the formula

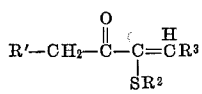

wherein R' and $R^3$ are as defined above and $R^2$ is an alkyl having at least one and a maximum of four carbon atoms, phenyl or tolyl.

In the preparation of the 4-pyrone valuable intermediates such as the 2-alkyl-3-thioether-6-carboalkoxy-2,3-dihydro-4-pyrones are prepared.

The 4-pyrones are valuable as flavor enhancer in food products.

---

This application is a continuation-in-part of my copending application Ser. No. 579,217, filed Sept. 14, 1966 and now abandoned.

Recent increase in the use of maltol, 2-methyl-3-hydroxy-4-pyrones, as a flavor enhancer in food products, such as breads, cakes, pies, candies and various beverages, such as coffee, have created a demand for maltol and substituted 4-pyrones which would not be dependent on natural products as starting compounds. The extraction of maltol from natural products, such as wood, or the synthesis utilizing a natural product as starting compound, such as kojic acid, involves elaborate and expensive purification processes which increase the cost of the maltol.

It is therefore an object of this invention to provide a novel synthetic process for the preparation of 4-pyrones which eliminates the above disadvantages.

It is another object of this invention to prepare 2-alkyl-3-thioether-6-carboalkoxy-2,3-dihydro-4-pyrone.

It is a still further object of this invention to prepare 2-methyl-3-hydroxy-4-pyrone.

Further objects, aspects and advantages of the invention will be apparent from the description which follows.

Briefly this invention provides a process for the preparation of 2-alkyl-3-hydroxy-4-pyrones by a novel synthetic chemical process utilizing commercially available compounds. The intermediates formed during this synthetic process are new and valuable compounds for the synthesis of maltol and other heterocyclic compounds.

Synthesis of 2-alkyl-3-hydroxy-4-pyrone, according to this invention, proceeds according to the following sequence of reactions:

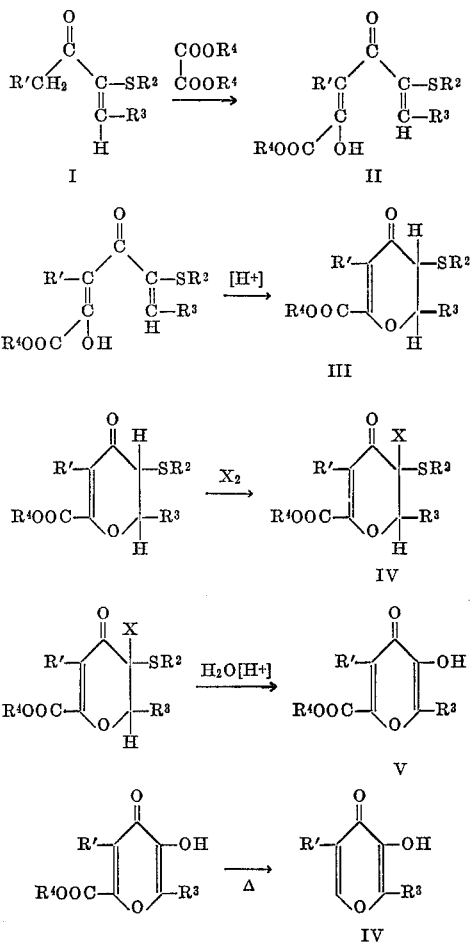

wherein R' is hydrogen or an alkyl, having at least one and a maximum of four carbon atoms, phenyl or tolyl; $R^2$ is an alkyl, having at least one and a maximum of four carbon atoms, phenyl or tolyl; $R^3$ is a hydrogen or alkyl group having a maximum of 4 carbon atoms; $R^4$ is an alkyl group having a maximum of 8 carbon atoms and X is a halogen selected from the group consisting of chlorine. and bromine.

The starting compound for the synthesis of 4-pyrones, according to the present invention is α-acylvinylthioether, the preparation of which is described in U.S. Patent 3,305,588, incorporated herein by reference. The compounds are formed by a condensation reaction of α-thioether ketones with aldehydes or ketones.

The reaction of the α-acylvinylthioether (I) with a diester of oxalic acid in a basic medium gives the condensation product, 1-hydroxy-1-carboalkoxy-4-thioetherhexa-1,-4-diene-3-one (II). This compound exists in its metal enolate form in the basic medium and does not have to be isolated prior to its reaction with acid which cyclizes the compound and forms the dihydro compound (III).

Reaction of the thio-substituted alkenes (I) with oxalic acid esters are temperature dependent because of the reactive nature of the conjugated system, especially in basic mediums. The reaction can be run at temperatures up to 50° C., however, competitive reactions occur at the higher temperatures decreasing the yield of the oxalation product II. Temperatures below 25° C. are therefore preferred.

The basic catalyst for the oxalation reaction is usually a metal alkoxide, although other basic materials, such as sodium metal and the like can be used.

Solvent for the reaction is any organic solvent which does not enter into a reaction with any component or product of the oxalation reaction. Ethers, hydrocarbons and aromatic hydrocarbons have been used successfully, with diethyl ether and benzene being the preferred solvent.

Alcohols, within specific limitations, can also be used as a solvent. There is a possibility of alcohol addition to the ethylenic linkage of the alkenone under the conditions of the oxalation reaction. This possibility decreases as the alcohol chain length increases.

The order of addition of components has been found to have an effect on the oxalation reaction. Low yields are obtained when the ketone and ester are added together to the catalyst. A formation of ester-catalyst complex prior to the addition of the alkenone increases the yields of condensation product.

Reverse addition of the base-ester complex to the ketone solution has also been successful.

The alcohol moiety of the oxalic acid diesters is not important and may include, among others, methyl, ethyl, propyl and butyl. For availability and ease of preparation, the alcohol moiety is restricted to alkyl groups having a maximum of 8 carbon atoms, although other alkyl and aromatic groups can also be used.

1 - hydroxy-1-carboalkoxy-3-thioether-hexa-1,4-diene-3-one, which is the oxalation condensation product, exists as the metal enolate form, which is its most stable form, while in the basic medium. Acidification gives the unstable free hydroxy compound which readily cyclizes to the dihydro-4-pyrone (III) compound. As a consequence, the intermediate is usually cyclized by acidifying the reaction medium without prior isolation of the intermediate or its metal enolate salt.

Acidification is under essentially anhydrous conditions utilizing non-oxidizing acids which can be either inorganic or organic in nature. Dry gases, such as hydrogen chloride, in dry ether are conveniently prepared and give excellent results. The preferred pH of the reaction mixture is about 1 to 2.

The temperature during acidification is kept below about 50° C. to prevent side reactions, such as condensation, from occurring and thus favor the cyclic formation.

2,3-dihydro-4-pyrone (III), which forms on cyclization, is a stable compound and is normally isolated before proceeding to the halogenation step.

In the reaction of 2 - alkyl - 3-thioether-6-carboethoxy-2,3-dihydro-4-pyrone (III) with halogen, competitive side reactions are possible and therefore a relatively low reaction temperature is utilized to minimize the side reactions. The reaction is run at a temperature below about 25° C. and preferably below about 0° C.

The reaction solvent should be inert to halogenation reactions and preferably at least partially miscible with water. Aliphatic and cyclic ethers, halogenated hydrocarbons and hydrocarbons have been used successfully even though the property of being miscible with water is not possessed by all of the examples. Dioxane has been found particularly useful as a solvent.

Bromine is the preferred halogen although chlorine or the chlorinating agent sulfuryl chloride can also be used. In the process, the compound is dissolved in the solvent, cooled and bromine, in the same solvent, added dropwise.

The brominated compound can either be isolated from the acidic mixture or hydrolyzed to 6-carboalkoxy maltol by the addition of water to the reaction medium.

In the event the bromo compound had been isolated, it is redissolved in the solvent, such as dioxane, and hydrolyzed with water. The reaction can be catalyzed with either acid or alkali although neither is required.

For the continuous process, hydrobromic acid is present in the mixture, as a by-product of the halogenation reaction and the subsequent hydrolysis would, therefore, be acid catalyzed.

Following the hydrolysis, the mixture is neutralized with calcium carbonate and the 6-carboalkoxy-4-pyrone recovered from the filtrate, after the calcium salt has been filtered off.

Removal of the thiol compound, formed by the hydrolysis, is by either distillation, when the thiol compound has a high vapor pressure, or by precipitation as an insoluble heavy metal salt, such as zinc, cadmium or lead. If the thiol salt is to be removed by precipitation, the heavy metal salt is added to the reaction mixture with the calcium carbonate.

Since the hydrolysis reaction can be run in neutral or basic mediums as well as in acidic mediums, the calcium carbonate and heavy metal salts can be added prior to the hydrolysis and will therefore remove the acid and thiol compound as they are formed during the process.

Conversion of 6-carboalkoxy-4-pyrone to 4-pyrone is by "pyrolysing" the 6-carboalkoxy group at a temperature in the approximate range of about 300 to 600° C. Within this temperature range the carboalkoxy group decomposes and is eliminated from the molecule. No solvent, as such, is required.

In a preferred procedure, the compound is distilled in a stream of inert gas, such as nitrogen, helium or argon and the gaseous mixture passed through a quartz tube heated to about 450 to 550° C. The gaseous medium is then cooled, depositing the 4-pyrone which is collected and purified.

Higher temperatures are required for carbomethoxy compounds than with carboethoxy and longer chained compounds. In the case of carbomethoxy groups, the use of higher temperatures is avoided by first hydrolyzing the ester to the free acid, which on heating readily decarboxylates to yield the desired 4-pyrone.

The final product of the pyrolysis or hydrolysis decarboxylation reaction is a 3-hydroxy-4-pyrone having a substituent in the 2- and/or 5-position, such as maltol, 2-methyl-3-hydroxy-4-pyrone.

A specific embodiment of the above generalized process is to react 3-ethylthio-pent-3-ene-2-one (I) with an oxalic acid diester in a basic medium at a temperature below about 50° C. to form a compound having the following formula:

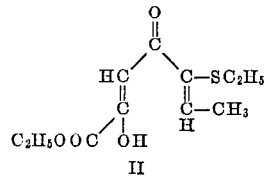

II

Acidification of the reaction medium at a temperature below about 50° C. cyclizes the compound to form 2 - methyl-3-ethylthio-6-carboethoxy-2,3-dihydro-4-pyrone (III). Compound III is dissolved in an inert solvent, such as dioxane, and reacted with a solution of bromine in dioxane, at a temperature which is maintained below about 25° C., to yield 2-methyl-3-ethylthio-3-bromo-6-carboethoxy - 2,3 - dihydro-4-pyrone (IV). Reaction compound IV with water forms 2-methyl-3-hydroxy-6-carboethoxy-4-pyrone (V, 6-carboethoxy-maltol), which on heating at a temperature between about 300 to 600° C. in the presence of an inert gas, such as nitrogen, yields maltol, 2-methyl-3-hydroxy-4-pyrone.

The following examples are illustrative of the invention:

EXAMPLE 1

The preparation of the starting compound α-acylvinylthioethers is according to the procedure in copending application Ser. No. 488,277, filed Sept. 17, 1965. An illustration of this procedure is the following preparation of 3-ethylthiopent-3-ene-2-one.

About 23.6 g. of 1-ethylthio-2-propanone and about 10 grams of acetaldehyde are dissolved in about 70 milliliters of ethanol. To the foregoing solution, about 3.0 grams of a 1 N solution of sodium ethoxide in ethanol is added. After an exothermic reaction has occurred, distillation of the crude material at 3 mm. Hg pressure yields 3-ethylthiopent-3-ene-2-one, having a boiling range of 44–47° C. at 0.4 mm. Hg pressure.

EXAMPLE 2

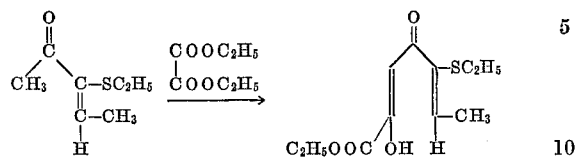

To a slurry of 1.2 g. (0.05 mole) sodium hydride in 50 ml. ether was added dropwise 2.3 g. (0.005 mole) dry ethanol to form a suspension of sodium ethoxide. Ethyl oxalate (7.3 g., 0.05 mole) was added to this suspension at a rate which caused and maintained a gentle reflux. A clear solution resulted, to which was added 7.2 g. (0.05 mole) 3-ethylthiopent-3-ene-2-one dissolved in 20 ml. dry ether at such a rate that the temperature was maintained at about 35 to 40° C. Stirring was continued after completion of addition for 2 hours at room temperature. The mixture was then concentrated.

EXAMPLE 3

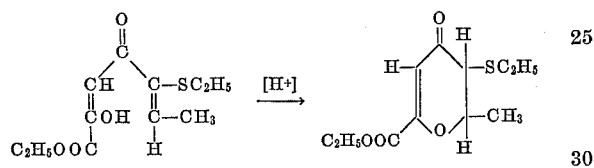

The concentrate obtained in Example 2 was dissolved in dry ether and acidified with dry HCl in ether and filtered. The filtrate was concentrated and the concentrate distilled, collecting the fraction boiling at 105–115°/100–150° which was a yellow liquid $M_D^{25}=1.5257$.

Elemental analysis of the yellow liquid compared to the theoretical content for 2-methyl-3-ethylthio-6-carbethoxy-2,3-dihydro-4-pyrone.

*Analysis.*—Calculated percent: C, 59.09; H, 6.60; S, 13.10. Found: C, 59.02; H, 6.76; S, 13.31.

EXAMPLE 4

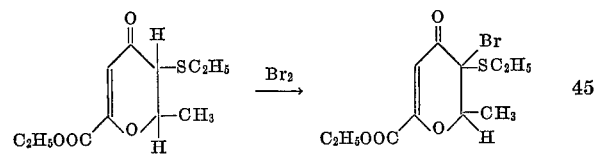

To a solution of 2.44 g. (0.01 mole) of 2-methyl-3-ethylthio-6-carboethoxy-2,3-dihydro-4-pyrone in 10 ml. dioxane at below 10° C., was added with stirring a solution of 1.6 g. (0.01 mole) of bromine in 5 ml. dioxane. The temperature was maintained at below about 0° C. throughout the addition. The halogen was consumed as added forming a slightly yellow solution. The mixture was neutralized, filtered and concentrated.

EXAMPLE 5

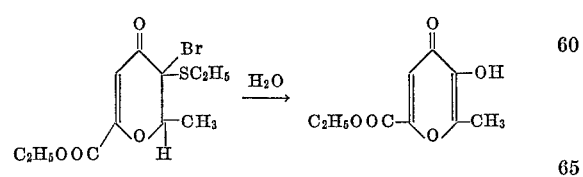

The concentrate obtained in Example 4, was dissolved in dioxane and water added with stirring. To this solution, at about 20° C., was added with stirring and cooling, finely powdered calcium carbonate until $CO_2$ evolution ceased. The resulting mixture was stirred for an additional two hours at room temperature, then filtered and the precipitate washed with dioxane. Concentration of the filtrate under reduced pressure yielded a semisolid mass which on recrystallization from ether yielded 2-methyl-3-hydroxy-6-carboethoxy-4 - pyrone, M.P. 123–125° C. Further recrystallization from ethanol yielded white needles, M.P. 126° C.

EXAMPLE 6

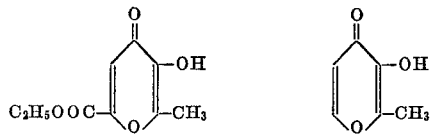

An amount of 3.0 g. of 6-carboethoxymaltol (2-methyl-3-hydroxy-6-carboethoxy-4-pyrone) was distilled at 20 mm. Hg pressure in a slow stream of nitrogen through an empty quartz tube heated to about 550° C. The effluent stream deposited 1.46 g. crude maltol. Part of the starting material remained in the still. Sublimation of the crude maltol at 120° C. (bath)/20 mm. afforded 1.20 g. of maltol, M.P. 126° C.

Other 4-pyrones that can be prepared by this procedure are illustrated in the following table:

| α-Acylvinylthioether | Diester of oxalic acid | Product |
| --- | --- | --- |
| 3-ethylthiopent-3-ene-2-one | Dihexyl ester | Maltol. |
| 4-n-butylthiohept-4-ene-3-one | Dipropyl ester | 2-ethyl-3-hydroxy-5-methyl-4-pyrone. |
| 1-phenyl-3-phenylthiokex-3-ene-2-one | Dimethyl ester | 2-ethyl-3-hydroxy-5-phenyl-4-pyrone. |
| 5-n-propylthiodec-5-ene-4-one | Diethyl ester | 2-n-butyl-3-hydroxy-5-ethyl-4-pyrone. |
| 1-p-tolyl-3-methylthiopent-3-ene-2-one | ...do... | 2-methyl-3-hydroxy-5-(p-tolyl)-4-pyrone. |

What is claimed is:
1. A process for preparing 3-hydroxy-4-pyrones which comprises:
(a) reacting a compound having the following formula:

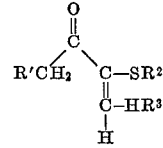

wherein R′ is selected from the group consisting of hydrogen, alkyl having at least one and a maximum of four carbon atoms, phenyl and tolyl; $R^2$ is selected from the group consisting of hydrogen and alkyl having at least one and a maximum of four carbon atoms, phenyl and tolyl; and $R^3$ is selected from the group consisting of hydrogen and alkyl having at least one and a maximum of four carbon atoms; with a diester of oxalic acid, in which each ester group is an alkyl group, in a basic medium at a temperature below about 50° C. to form a compound having the following formula:

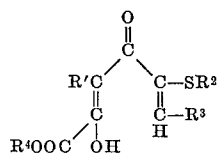

wherein R′, $R^2$ and $R^3$ have the same meaning as above and $R^4$ is an alkyl having a maximum of eight carbon atoms,
(b) treating the compound formed in step (a) with an acid medium at a temperature below about 50° C. to form a compound having the following formula:

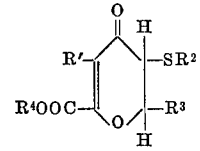

wherein R′, $R^2$, $R^3$ and $R^4$ have the same meaning as above, (c) reacting compound formed in step (b) with a halogenating agent in an inert solvent at a temperature below about 25° C. to form a compound having the following formula:

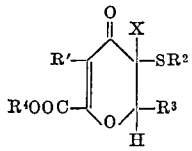

wherein R', R², R³ and R⁴ have the same meaning as above and in which X is a halogen selected from the group consisting of chlorine and bromine, (d) treating the compound formed in step (c) with water, to form a compound having the following formula:

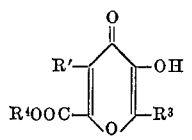

wherein R', R³ and R⁴ have the same meaning as above, (e) heating the compound formed in step (d) in an inert gas at a temperature in the range of about 300 to 600° C. to form a compound having the following formula:

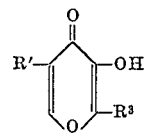

wherein R' and R³ have the same meaning as above.

2. A process in accordance with claim 1 in which:
(a) said compound has the following formula:

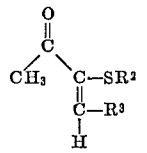

wherein R² and R³ are each alkyl,
(b) said acidic medium is comprised of an acid selected from the group consisting of inorganic and organic acids and an inert solvent.

3. A process in accordance with claim 2 in which
(b) said acid is dry hydrogen chloride,
(c) said halogen is bromine and said temperature is below about 10° C.,
(e) said temperature is in the approximate range of 450 to 550° C.

4. A process in accordance with claim 3 in which
(a) said R² is ethyl, R³ is methyl, said ester group is selected from the group consisting of methyl, ethyl, propyl, butyl and amyl and said temperature is below about 20° C.,
(c) said inert solvent is selected from the group consisting of acyclic and cyclic ethers and hydrocarbons,
(e) said inert gas is nitrogen.

5. A process in accordance with claim 4 in which
(a) said ester group is ethyl,
(c) said inert solvent is a cyclic ether.

6. A compound having the following formula:

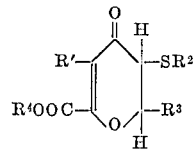

wherein R' is selected from the group consisting of hydrogen, alkyl having at least one and a maximum of four carbon atoms, phenyl and tolyl; R² is selected from the group consisting of alkyl having at least one and a maximum of four carbon atoms, phenyl and tolyl; R³ is selected from the group consisting of hydrogen and alkyl having at least one and a maximum of four carbon atoms and R⁴ is an alkyl having a maximum of eight carbon atoms.

7. A compound in accordance with claim 6 wherein R' is hydrogen and R² and R³ are each alkyl.

8. A compound in accordance with claim 7 wherein R², R³ and R⁴ are each members selected from the group consisting of methyl, ethyl, propyl and butyl.

9. A compound in accordance with claim 7 in which R² is ethyl, R³ is methyl and R⁴ is ethyl.

References Cited

UNITED STATES PATENTS 3,159,652   12/1964   Tate et al. _____ 260—345.9

NORMA S. MILESTONE, Primary Examiner

U.S. Cl. X.R.

260—345.9